United States Patent
Swarup et al.

(10) Patent No.: US 10,767,073 B2
(45) Date of Patent: Sep. 8, 2020

(54) CURABLE FILM-FORMING COMPOSITIONS CONTAINING HYDROXYL FUNCTIONAL, BRANCHED ACRYLIC POLYMERS AND MULTILAYER COMPOSITE COATINGS

(71) Applicant: PPG INDUSTRIES OHIO, INC., Cleveland, OH (US)

(72) Inventors: Shanti Swarup, Allison Park, PA (US); Jason Ryan Lewis, Monaca, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 150 days.

(21) Appl. No.: 15/296,514

(22) Filed: Oct. 18, 2016

(65) Prior Publication Data

US 2018/0105718 A1    Apr. 19, 2018

(51) Int. Cl.

| | | |
|---|---|---|
| C09D 167/00 | (2006.01) | |
| C08F 220/18 | (2006.01) | |
| C09D 5/00 | (2006.01) | |
| C08L 79/00 | (2006.01) | |
| C09D 133/06 | (2006.01) | |
| C08L 33/04 | (2006.01) | |
| C08L 33/06 | (2006.01) | |
| C08L 33/08 | (2006.01) | |
| C09D 133/10 | (2006.01) | |
| C09D 133/04 | (2006.01) | |
| C08L 67/00 | (2006.01) | |
| C09D 133/08 | (2006.01) | |
| B05D 7/00 | (2006.01) | |
| C08F 220/12 | (2006.01) | |
| C08F 220/10 | (2006.01) | |
| C08F 220/20 | (2006.01) | |
| C08G 63/685 | (2006.01) | |
| C08G 63/68 | (2006.01) | |
| C08K 5/00 | (2006.01) | |
| C08J 3/24 | (2006.01) | |

(52) U.S. Cl.
CPC ......... *C09D 167/00* (2013.01); *C08F 220/18* (2013.01); *C08L 79/00* (2013.01); *C09D 5/00* (2013.01); *B05D 7/00* (2013.01); *B05D 7/50* (2013.01); *B05D 7/52* (2013.01); *B05D 7/53* (2013.01); *B05D 7/532* (2013.01); *B32B 2255/26* (2013.01); *B32B 2255/28* (2013.01); *C08F 220/10* (2013.01); *C08F 220/12* (2013.01); *C08F 220/1804* (2020.02); *C08F 220/1806* (2020.02); *C08F 220/1807* (2020.02); *C08F 220/1808* (2020.02); *C08F 220/1811* (2020.02); *C08F 220/20* (2013.01); *C08G 63/68* (2013.01); *C08G 63/685* (2013.01); *C08J 3/24* (2013.01); *C08K 5/0025* (2013.01); *C08L 33/04* (2013.01); *C08L 33/06* (2013.01); *C08L 33/062* (2013.01); *C08L 33/066* (2013.01); *C08L 33/08* (2013.01); *C08L 67/00* (2013.01); *C08L 2205/05* (2013.01); *C08L 2312/00* (2013.01); *C09D 133/04* (2013.01); *C09D 133/06* (2013.01); *C09D 133/062* (2013.01); *C09D 133/066* (2013.01); *C09D 133/08* (2013.01); *C09D 133/10* (2013.01); *Y10T 428/31786* (2015.04); *Y10T 428/31794* (2015.04); *Y10T 428/31928* (2015.04)

(58) Field of Classification Search
None
See application file for complete search history.

(56) References Cited

U.S. PATENT DOCUMENTS

| | | | | | |
|---|---|---|---|---|---|
| 4,062,816 | A | * | 12/1977 | Shields | C07K 14/6555 525/54.11 |
| 4,289,682 | A | * | 9/1981 | Peters | C08G 18/683 264/328.18 |
| 4,342,840 | A | * | 8/1982 | Kozawa | C08G 18/675 521/137 |

(Continued)

FOREIGN PATENT DOCUMENTS

| | | |
|---|---|---|
| EP | 0767187 | 4/1997 |
| EP | 0767227 | 4/1997 |

(Continued)

OTHER PUBLICATIONS

Machine English translation of EP1131384A1 (Abstract and Claim), (2001).
Machine English translation of RU2243216C2, (2004).

*Primary Examiner* — Vivian Chen
(74) *Attorney, Agent, or Firm* — Krisanne Shideler

(57) ABSTRACT

A curable film-forming composition is provided, comprising:
(a) a polymeric polyester binder comprising a plurality of carbamate groups;
(b) a curing agent reactive with the carbamate functional groups of (a); and
(c) a reaction product of:
(1) a hydroxyl functional polymer comprising the reaction product of:
 (i) a monomer comprising at least two ethylenically unsaturated double bonds;
 (ii) a monomer comprising a carbon atom that is bonded to four moieties wherein one of the moieties is a hydrogen atom and the remainder of the moieties comprises an alkyl group, wherein at least one of the alkyl group-containing moieties comprises an ethylenically unsaturated double bond; and
 (iii) at least one monomer that is polymerizable with (i) and (ii); and
(2) a lactone or lactam. Also provided are a multi-component composite coating composition that includes the curable film-forming composition described above and methods for forming a composite coating on a substrate.

15 Claims, No Drawings

(56) References Cited

U.S. PATENT DOCUMENTS

| | | | | |
|---|---|---|---|---|
| 4,368,320 A * | 1/1983 | Aldinger | C08F 220/28 | 525/374 |
| 4,504,635 A * | 3/1985 | Weber, Jr. | C08F 220/28 | 525/123 |
| 4,847,329 A * | 7/1989 | Koleske | C08F 20/36 | 525/162 |
| 4,916,254 A * | 4/1990 | Watanabe | C08G 63/06 | 560/185 |
| 5,212,273 A | 5/1993 | Das et al. | | |
| 5,412,049 A * | 5/1995 | Argyropoulos | C08F 220/28 | 526/301 |
| 5,593,733 A * | 1/1997 | Mayo | C09D 167/00 | 427/407.2 |
| 5,627,240 A | 5/1997 | Furukawa et al. | | |
| 5,686,532 A * | 11/1997 | Bederke | C08F 8/00 | 525/222 |
| 5,709,950 A * | 1/1998 | Burgman | C08G 18/4615 | 428/423.1 |
| 5,739,230 A * | 4/1998 | Yuasa | C09D 4/00 | 526/217 |
| 5,792,810 A * | 8/1998 | Menovcik | C08G 71/00 | 428/423.1 |
| 5,814,410 A * | 9/1998 | Singer | C08F 8/30 | 427/407.1 |
| 5,845,385 A * | 12/1998 | Foerstel | H05K 13/021 | 29/464 |
| 5,922,475 A * | 7/1999 | Barancyk | C09D 133/062 | 428/482 |
| 5,976,701 A * | 11/1999 | Barancyk | C09D 171/02 | 428/423.1 |
| 5,994,479 A * | 11/1999 | Green | C08G 18/8077 | 428/423.1 |
| 6,013,733 A * | 1/2000 | Singer | C09D 201/00 | 525/208 |
| 6,084,038 A * | 7/2000 | Ohrbom | C07D 251/34 | 525/129 |
| 6,103,816 A * | 8/2000 | Swarup | C08F 8/32 | 524/458 |
| 6,235,858 B1 * | 5/2001 | Swarup | C08F 8/30 | 427/388.3 |
| 6,277,929 B1 * | 8/2001 | Kitahara | C08G 18/68 | 522/6 |
| 6,294,607 B1 * | 9/2001 | Guo | C08F 283/006 | 524/507 |
| 6,387,519 B1 * | 5/2002 | Anderson | B82Y 30/00 | 428/323 |
| 6,451,930 B1 * | 9/2002 | Burgnnan | C08G 18/6295 | 525/452 |
| 6,534,188 B2 | 3/2003 | Sadvary et al. | | |
| 6,592,998 B2 | 7/2003 | Anderson et al. | | |
| 6,592,999 B1 * | 7/2003 | Anderson | B05D 7/57 | 428/447 |
| 6,652,971 B1 * | 11/2003 | Delnnotte | C08F 8/14 | 428/413 |
| 7,160,959 B2 * | 1/2007 | Ziegler | C09D 5/033 | 524/904 |
| 9,938,429 B2 * | 4/2018 | Colyer | C09D 167/00 | |
| 2002/0028879 A1 * | 3/2002 | Chasser | C08G 77/388 | 525/101 |
| 2002/0037973 A1 * | 3/2002 | Ambrose | C08G 12/20 | 525/452 |
| 2003/0050432 A1 * | 3/2003 | Ramesh | B01F 17/005 | 528/354 |
| 2003/0148126 A1 * | 8/2003 | Tian | C08G 63/08 | 428/480 |
| 2003/0149227 A1 * | 8/2003 | Okazaki | C08F 20/28 | 528/310 |
| 2003/0190434 A1 * | 10/2003 | Byers | B05D 7/53 | 427/498 |
| 2003/0204013 A1 * | 10/2003 | Swarup | C09D 7/65 | 524/558 |
| 2003/0220446 A1 * | 11/2003 | Faler | C08G 18/0823 | 524/590 |
| 2004/0214942 A1 * | 10/2004 | Huybrechts | C08G 18/6229 | 524/507 |
| 2005/0209402 A1 * | 9/2005 | Ziegler | C09D 5/033 | 525/165 |
| 2005/0250901 A1 * | 11/2005 | Kania | C08F 212/08 | 524/804 |
| 2005/0287354 A1 * | 12/2005 | Jennings | B05D 7/14 | 428/323 |
| 2007/0009740 A1 * | 1/2007 | Burgman | C09D 143/00 | 428/411.1 |
| 2007/0082211 A1 * | 4/2007 | Hazan | B05D 7/572 | 428/500 |
| 2007/0142591 A1 * | 6/2007 | Johnson | C08F 2/06 | 526/318.43 |
| 2007/0190311 A1 * | 8/2007 | Hazan | B05D 7/14 | 428/323 |
| 2007/0218274 A1 * | 9/2007 | Kania | C08F 212/08 | 428/332 |
| 2007/0292623 A1 * | 12/2007 | Lin | C09D 1/00 | 427/407.1 |
| 2008/0114125 A1 * | 5/2008 | Bzowej | C08F 220/00 | 525/94 |
| 2008/0132646 A1 * | 6/2008 | Trindade | C08G 18/2865 | 525/124 |
| 2008/0287622 A1 * | 11/2008 | Johnson | C08F 2/06 | 526/194 |
| 2009/0221741 A1 * | 9/2009 | Billiani | C08F 220/18 | 524/558 |
| 2010/0041850 A1 * | 2/2010 | Berger | C07H 13/06 | 527/314 |
| 2010/0249263 A1 * | 9/2010 | Huynh-Ba | C08G 18/6229 | 522/104 |
| 2011/0070450 A1 * | 3/2011 | Hazan | B05D 7/14 | 428/423.1 |
| 2011/0201716 A1 * | 8/2011 | Gehinger | C08G 18/4018 | 521/172 |
| 2011/0256320 A1 * | 10/2011 | Gebregiorgis | B05D 7/14 | 427/385.5 |
| 2012/0196975 A1 * | 8/2012 | Frank | C08F 220/18 | 524/558 |
| 2012/0225992 A1 * | 9/2012 | Shalati | C08G 18/4669 | 524/507 |
| 2014/0248502 A1 * | 9/2014 | Heymans | C09D 163/00 | 428/463 |
| 2014/0248503 A1 * | 9/2014 | Heymans | C08G 65/2615 | 428/463 |
| 2014/0255608 A1 * | 9/2014 | Eibon | C09D 133/00 | 427/380 |
| 2015/0122409 A1 * | 5/2015 | Roper | B05D 5/066 | 156/230 |
| 2016/0090431 A1 * | 3/2016 | Jain | C09J 175/04 | 524/507 |
| 2018/0162099 A1 * | 6/2018 | Furar | C01B 33/32 | |
| 2018/0334584 A1 * | 11/2018 | Lewis | C09J 133/066 | |
| 2018/0344622 A9 * | 12/2018 | Piccotti | A61K 36/03 | |

FOREIGN PATENT DOCUMENTS

| | | |
|---|---|---|
| EP | 1131384 A1 | 9/2001 |
| EP | 0767227 B1 | 11/2001 |
| EP | 1525279 | 4/2005 |
| JP | 2002-167490 A * | 6/2002 |
| RU | 2243216 C2 | 12/2004 |
| WO | 9935198 | 7/1999 |
| WO | 0026313 | 5/2000 |
| WO | WO 02/50199 A * | 6/2002 |

* cited by examiner

US 10,767,073 B2

CURABLE FILM-FORMING COMPOSITIONS CONTAINING HYDROXYL FUNCTIONAL, BRANCHED ACRYLIC POLYMERS AND MULTILAYER COMPOSITE COATINGS

FIELD OF THE INVENTION

The present invention relates to curable film-forming compositions that comprise hydroxyl functional, branched acrylic polymers. The present invention also relates to multi-layer composite coatings comprising the curable film-forming compositions and methods for forming a composite coating on a substrate.

BACKGROUND OF THE INVENTION

Color-plus-clear coating systems involving the application of a colored or pigmented basecoat to a substrate followed by the application of a transparent or clear topcoat to the basecoat are standard in the industry as original finishes for automobiles. The color-plus-clear systems have outstanding gloss and distinctness of image, and the clear topcoat is particularly important for these properties.

Often during application of the coatings to an automotive substrate, which is typically done by spraying, the appearance of a coating (such as its smoothness) is different when applied to a horizontally oriented substrate surface than when applied to a vertically oriented surface. This can result in noticeably different surface appearances in different areas of the same vehicle.

It would be desirable to provide a curable film-forming composition which demonstrates improved appearance properties over an entire substrate surface without loss of cured film properties such as acid etch resistance and UV durability.

SUMMARY OF THE INVENTION

The present invention provides a curable film-forming, or coating, composition comprising:
(a) a polymeric polyester binder comprising a plurality of carbamate groups of the structure:

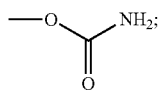

(b) a curing agent comprising functional groups that are reactive with the carbamate functional groups of (a); and
(c) a reaction product of:
(1) a hydroxyl functional polymer comprising the reaction product of:
 (i) a monomer comprising at least two ethylenically unsaturated double bonds;
 (ii) a monomer comprising a carbon atom that is bonded to four moieties wherein one of said moieties is a hydrogen atom and the remainder of said moieties comprises an alkyl group, wherein at least one of the alkyl group-containing moieties comprises an ethylenically unsaturated double bond; and
 (iii) at least one monomer that is polymerizable with (i) and (ii); wherein each monomer (i), (ii), and (iii) is different and wherein the monomer (i), (ii) and/or (iii) contains a hydroxyl functional group; and (2) a lactone or lactam.

Also provided is a multi-component composite coating composition comprising a first film-forming composition applied to a substrate to form a colored base coat, and a second, transparent film-forming composition applied on top of the base coat to form a clear top coat, wherein the transparent film-forming composition comprises the curable film-forming composition described above.

Additionally provided is a method for forming a composite coating on a substrate comprising:
(A) applying a first film-forming composition to at least a portion of a surface of the substrate to form a colored base coat;
(B) applying a second, transparent film-forming composition to at least a portion of the base coat formed in step (A) prior to substantially curing the first film-forming composition, to form a clear top coat thereon, wherein the transparent film-forming composition comprises the curable film-forming composition described above; and
(C) holding the substrate at a temperature and for a time sufficient to substantially cure the composite coating after all coating layers have been applied to the substrate.

DETAILED DESCRIPTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Plural referents as used herein encompass singular and vice versa. For example, while the invention has been described in terms of "an" acrylic resin having epoxy functional groups, a plurality, including a mixture of such resins can be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of functional groups to give the equivalent weight. For example, urethane equivalent weight is based on the equivalents of urethane groups in the polyurethane material.

The curable film-forming compositions of the present invention may be solventborne or waterborne. As used herein, the terms "thermosetting" and "curable" can be used interchangeably and refer to resins that "set" irreversibly upon curing or crosslinking, wherein the polymer chains of the polymeric components are joined together by covalent bonds. This property is usually associated with a crosslinking reaction of the composition constituents often induced, for example, by heat or radiation. See Hawley, Gessner G., The Condensed Chemical Dictionary, Ninth Edition, page 856; Surface Coatings, vol. 2, Oil and Colour Chemists' Association, Australia, TAFE Educational Books (1974). Once cured or crosslinked, a thermosetting resin will not melt upon the application of heat and is insoluble in solvents.

The curable film-forming compositions of the present invention comprise (a) a polymeric binder containing repeating ester groups in the polymer backbone; i. e., a polyester. The polyester polymers are typically prepared by a condensation reaction of polyacids and polyols. As used herein, the term "polymer" is meant to refer to polymers, prepolymers, and oligomers; the prefix "poly" refers to two or more.

A suitable polyester can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare the polyester include diols such as ethylene glycol, 1,6-hexanediol, neopentyl glycol (2,2-dimethyl-1,3-propanediol), 2,2,4-trimethyl-1,3-pentanediol, and 2,2-dimethyl-3-hydroxypropyl-2,2-dimethyl-3-hydroxypropionate. Other suitable diols include hydrogenated Bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like.

Although the polyol component can comprise all diols, polyols of higher functionality can also be used. Often the polyol is a mixture of at least one diol and at least one triol or polyol of higher functionality. Examples of polyols of higher functionality would include trimethylol ethane, trimethylol propane, pentaerythritol, and the like. The mole ratio of polyols of higher functionality to diol may be 1:1, or 1:2, or 1:3, or 1:4.

In a particular example, a polyester is prepared from a mixture of diols such as neopentyl glycol and 2,2,4-trimethyl-1,3-pentanediol, and a triol such as trimethylolpropane, in a triol:diol molar ratio of 1:4.

The polyester has terminal carbamate groups of the structure:

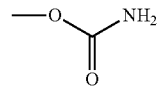

The carbamate groups can be incorporated into the polyester by any known method, such as by first forming a hydroxyalkyl carbamate that can be reacted with the polyacids and polyols used in forming the polyester. An example of a hydroxyalkyl carbamate is the reaction product of ammonia and propylene carbonate. A polyester oligomer can be prepared by reacting a polycarboxylic acid such as those mentioned above with a hydroxyalkyl carbamate. The hydroxyalkyl carbamate is condensed with acid functionality on the polyester or polycarboxylic acid, yielding terminal carbamate functionality. Terminal carbamate functional groups can also be incorporated into the polyester by reacting isocyanic acid with a hydroxy functional polyester. Also, carbamate functionality can be incorporated into the polyester by reacting a hydroxy functional polyester with urea.

In this reaction, a low molecular weight carbamate functional material derived from a low molecular weight alcohol or glycol ether is reacted with the hydroxyl groups of the polyol, yielding a carbamate functional polyether and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is particularly suitable for this reaction.

Carbamate functionality may alternatively be incorporated into the polyester by including a lower alkyl ester of carbamic acid in the polymerization reaction mixture. Examples include methyl carbamate, ethyl carbamate, and the like.

Besides carbamate functionality the polyester polymers may contain other functional groups such as hydroxyl, carboxylic acid and/or anhydride groups. The equivalent weight of the polyesters containing terminal carbamate groups will be from about 140 to 2500, based on equivalents of carbamate groups. The equivalent weight is a calculated value based on the relative amounts of the various ingredients used in making the polyester, and is based on the solids of the material.

The polyesters typically have weight average molecular weights of about 1000 to 30,000, preferably 1000 to 10,000. Regarding molecular weights, whether number average ($M_n$) or weight average ($M_w$), these quantities are determined by gel permeation chromatography using polystyrene as standards as is well known to those skilled in the art.

The amount of the polymeric binder (a) in the curable film-forming composition generally ranges from 25 to 95 percent by weight based on the total weight of resin solids in the curable film-forming composition. For example, the minimum amount of polymeric binder may be at least 25 percent by weight, often at least 30 percent by weight and more often, at least 40 percent by weight. The maximum amount of polymeric binder may be 95 percent by weight, more often 85 percent by weight, or 75 percent by weight. Ranges of polymeric binder may include, for example, 25 to 90 percent by weight, 25 to 80 percent by weight, 30 to 70 percent by weight, 30 to 60 percent by weight, and 30 to 50 percent by weight.

As used herein, the phrase "based on the total weight of resin solids" or "based on the total weight of organic binder solids" (used interchangeably) of the composition means that the amount of the component added during the formation of the composition is based upon the total weight of the resin solids (non-volatiles) of the film forming materials, including cross-linkers and polymers present during the formation of the composition, but not including any water, solvent, or any additive solids such as hindered amine stabilizers, photoinitiators, pigments including extender pigments and fillers, flow modifiers, catalysts, and UV light absorbers.

The curable film-forming compositions of the present invention further comprise (b) a curing agent containing functional groups that are reactive with the carbamate functional groups of (a). Such curing agents typically comprise one or more aminoplasts. Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL®, and from INEOS Melamines under the trademark RESIMENE®, such as RESIMENE 718 and RESIMENE HM-2608.

The amount of the curing agent in the curable film-forming composition generally ranges from 5 to 75 percent by weight based on the total weight of resin solids in the curable film-forming composition. For example, the minimum amount of curing agent may be at least 5 percent by weight, often at least 10 percent by weight and more often, at least 15 percent by weight. The maximum amount of curing agent may be 75 percent by weight, more often 60 percent by weight, or 50 percent by weight. Ranges of curing agent may include, for example, 5 to 50 percent by weight, 5 to 60 percent by weight, 10 to 50 percent by weight, 10 to 60 percent by weight, 10 to 75 percent by weight, 15 to 50 percent by weight, 15 to 60 percent by weight, and 15 to 75 percent by weight.

The curable film-forming compositions of the present invention further comprise (c) a reaction product of (1) a hydroxyl functional polymer and (2) a lactone or lactam. The hydroxyl functional polymer (1) in turn comprises the reaction product of:

(i) a monomer comprising at least two ethylenically unsaturated double bonds;

(ii) a monomer comprising a carbon atom that is bonded to four moieties. One of said moieties is a hydrogen atom and the remainder of said moieties comprises an alkyl group, wherein at least one of the alkyl group-containing moieties comprises an ethylenically unsaturated double bond, and wherein none of the alkyl group containing moieties form a cycloaliphatic ring; and (iii) at least one monomer that is polymerizable with (i) and (ii). Each of the monomers (i) (ii) and (iii) is different from each other and the monomer (i), (ii) and/or (iii) contains a hydroxyl functional group.

The reaction product that is formed from reactive components (i), (ii), and (iii) is a branched reaction product. In some cases, the polymer "consists of" or "consists essentially of" the reaction product of reactive components (i), (ii), and (iii).

The weight average molecular weight of the reaction product may range from 500 to 10,000, including any range in between.

Reactive component (i) may comprise any monomer known in the art which contains at least two ethylenically unsaturated double bonds. Suitable monomers that may be used as reactive component (i) include, without limitation, di(meth)acrylates (e.g., hexanediol(meth)diacrylate), ethylene glycol di(meth)acrylate, butanediol di(meth)acrylate, decandediol di(meth)acrylate, or a combination of di(meth)acrylates.

Typically, reactive component (i) makes up at least 1 percent by weight, or at least 5 percent by weight, or at least 10 percent by weight, or at least 15 percent by weight of the reaction mixture used to prepare the hydroxyl functional polymer (1). Also, reactive component (i) makes up at most 40 percent by weight, or at most 30 percent by weight, or at most 20 percent by weight of the reaction mixture used to prepare the hydroxyl functional polymer (1).

Reactive component (ii) may comprise any monomer known in the art which contains a carbon atom that is bonded to four moieties, wherein one of the moieties is a hydrogen atom and the remainder of the moieties each independently comprises an alkyl group. At least one of the alkyl group-containing moieties contains an ethylenically unsaturated double bond. Suitable monomers that may be used as reactive component (ii) include, without limitation, 2-ethyl hexyl(meth)acrylate, 2-butyl hexyl(meth)acrylate, 2-methyl hexyl(meth)acrylate, isobornyl acrylate, isobornyl methacrylate, or combinations thereof. The monomer used as component (ii) may or may not include an additional reactive functional group, such as a hydroxyl functional group.

Typically, reactive component (ii) makes up at least 10 percent by weight, or at least 15 percent by weight, or at least 20 percent by weight of the reaction mixture used to prepare the hydroxyl functional polymer (1). Also, reactive component (ii) makes up at most 70 percent by weight, or at most 60 percent by weight, or at most 50 percent by weight of the reaction mixture used to prepare the hydroxyl functional polymer (1).

Reactive component (iii) may comprise any monomer that is polymerizable with reactive components (i) and (ii). Often reactive component (iii) comprises an ethylenically unsaturated monomer containing a hydroxyl functional group. Reactive component (iii) may alternatively or further comprise an ethylenically unsaturated monomer that does not contain any additional, different functional groups other than the ethylenic unsaturation. Note that at least one of the reactive components (i), (ii) and (iii) must comprise a monomer containing a reactive hydroxyl functional group. Suitable monomers that may be used as reactive component (iii) include, without limitation, styrene, hydroxy functional (meth)acrylates (e.g., hydroxyethyl(meth)acrylate, hydroxy butyl(meth)acrylate, hydroxy propyl(meth)acrylate), or combinations thereof.

If monomers used as reactive components (i), (ii) and (iii) comprise additional reactive functional groups, the reactive functional groups can either be the same or different, provided at least one monomer contains hydroxyl functional groups.

Typically, reactive component (iii) makes up at least 15 percent by weight, or at least 35 percent by weight, or at least 45 percent by weight of the reaction mixture used to prepare the hydroxyl functional polymer (1). Also, reactive component (iii) makes up at most 80 percent by weight, or at most 70 percent by weight, or at most 60 percent by weight of the reaction mixture used to prepare the hydroxyl functional polymer (1).

The hydroxyl functional polymer (1) described above may be formed by mixing the above identified reactive components in a reaction vessel with an organic solvent and a polymerization initiator. Any organic solvents known in the art may be used in the formation of the polymer. Suitable organic solvents that may be used in the formation of the polymer include, without limitation, methylisobutyl ketone, mixtures of hydrocarbons such as AROMATIC 100 (commercially available from Ashland Chemicals, Inc.), xylene, toluene, or combinations thereof. Any polymerization initiators known in the art may also be used in the formation of the polymer described above. Suitable polymerization initiators include, without limitation, ditertiary butyl peroxide, tertiary butyl peroxy acetate, ditertiary amyl peroxide, or combinations thereof. After the reaction vessel is charged with the reactive components described above, the reaction vessel can then be heated for a time period ranging from 2 hours to 6 hours, such as 4 hours, at a temperature ranging from 60° to 200° C., such as 120° C. to 180° C., in order to form the polymer.

The hydroxyl functional polymer (1) is reacted with a lactone or lactam (2) to form the reaction product (c), which may contain hydroxyl and/or amine functional groups. Suitable lactones include one or more of beta-propiolactone, gamma-butyrolactone, and epsilon-caprolactone. Lactams may be selected from any known alpha-, beta-, gamma-, delta-, and epsilon-lactams, including mixtures thereof. The reaction may be conducted according to any esterification process as known in the art.

The curable film-forming composition of the present invention may further comprise additional polymeric resins, usually hydroxyl functional resins such as one or more acrylic and/or polyester polyols.

Suitable acrylic polyols include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic polyol includes hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. (Note: these epoxy functional monomers may also be used to prepare epoxy functional acrylic polymers.) Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

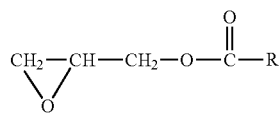

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Suitable additional polyester polyols include hydroxyl-functional copolymers of any of the polyacids and polyols disclosed above. The curable film-forming composition of the present invention may additionally include other optional ingredients commonly used in such compositions. For example, the composition may further comprise a hindered amine light stabilizer for UV degradation resistance. Such hindered amine light stabilizers include those disclosed in U.S. Pat. No. 5,260,135. When they are used they are present in the composition in an amount of 0.1 to 2 percent by weight, based on the total weight of resin solids in the film-forming composition. Other optional additives may be included such as colorants, plasticizers, abrasion-resistant particles, film strengthening particles, flow control agents, thixotropic agents, rheology modifiers, fillers, catalysts, antioxidants, biocides, defoamers, surfactants, wetting agents, dispersing aids, adhesion promoters, UV light absorbers and stabilizers, a stabilizing agent, organic cosolvents, reactive diluents, grind vehicles, and other customary auxiliaries, or combinations thereof.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discrete "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. Special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles.

As used herein, the terms "adhesion promoter" and "adhesion promoting component" refer to any material that, when included in the composition, enhances the adhesion of the coating composition to a metal substrate. Such an adhesion promoting component often comprises a free acid. As used herein, the term "free acid" is meant to encompass organic and/or inorganic acids that are included as a separate component of the compositions as opposed to any acids that may be used to form a polymer that may be present in the composition. The free acid may comprise tannic acid, gallic acid, phosphoric acid, phosphorous acid, citric acid, malonic acid, a derivative thereof, or a mixture thereof. Suitable derivatives include esters, amides, and/or metal complexes of such acids. Often, the free acid comprises a phosphoric acid, such as a 100 percent orthophosphoric acid, superphosphoric acid or the aqueous solutions thereof, such as a 70 to 90 percent phosphoric acid solution.

In addition to or in lieu of such free acids, other suitable adhesion promoting components are metal phosphates, organophosphates, and organophosphonates. Suitable organophosphates and organophosphonates include those disclosed in U.S. Pat. No. 6,440,580 at column 3, line 24 to column 6, line 22, U.S. Pat. No. 5,294,265 at column 1, line 53 to column 2, line 55, and U.S. Pat. No. 5,306,526 at column 2, line 15 to column 3, line 8, the cited portions of which are incorporated herein by reference. Suitable metal phosphates include, for example, zinc phosphate, iron phosphate, manganese phosphate, calcium phosphate, magnesium phosphate, cobalt phosphate, zinc-iron phosphate, zinc-manganese phosphate, zinc-calcium phosphate, including the materials described in U.S. Pat. Nos. 4,941,930, 5,238,506, and 5,653,790. As noted above, in certain situations, phosphates are excluded.

The adhesion promoting component may comprise a phosphatized epoxy resin. Such resins may comprise the reaction product of one or more epoxy-functional materials and one or more phosphorus-containing materials. Non-limiting examples of such materials, which are suitable for use in the present invention, are disclosed in U.S. Pat. No. 6,159,549 at column 3, lines 19 to 62, the cited portion of which is incorporated by reference herein.

The curable film-forming composition of the present invention may also comprise alkoxysilane adhesion promoting agents, for example, acryloxyalkoxysilanes, such as γ-acryloxypropyltrimethoxysilane and methacrylatoalkoxysilane, such as γ-methacryloxypropyltrimethoxysilane, as well as epoxy-functional silanes, such as γ-glycidoxypropyltrimethoxysilane. Exemplary suitable alkoxysilanes are described in U.S. Pat. No. 6,774,168 at column 2, lines 23 to 65, the cited portion of which is incorporated by reference herein.

The adhesion promoting component is usually present in the coating composition in an amount ranging from 0.05 to 20 percent by weight, such as at least 0.05 percent by weight or at least 0.25 percent by weight, and at most 20 percent by weight or at most 15 percent by weight, with ranges such as 0.05 to 15 percent by weight, 0.25 to 15 percent by weight, or 0.25 to 20 percent by weight, with the percentages by weight being based on the total weight of resin solids in the composition.

The curable film-forming compositions of the present invention may be formulated to a solids (non-volatile) content of at least 58 percent by weight, such as at least 59 percent by weight, or at least 60 percent by weight, based on the total weight of the curable film-forming composition.

Substrates to which compositions of the present invention may be applied include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The substrate may alternatively comprise a polymer or a composite material such as a fiberglass composite. Car parts typically formed from thermoplastic and thermoset materials include bumpers and trim.

Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with an appropriate solution known in the art, such as a metal phosphate solution, an aqueous solution containing at least one Group IIIB or IVB metal, an organophosphate solution, an organophosphonate solution, and combinations thereof, as discussed below. Examples of aluminum alloys include those alloys used in the automotive or aerospace industry, such as 2000, 6000, or 7000 series aluminums; 2024, 7075, 6061 are particular examples. Alloys may be unclad or they may contain a clad layer on one or more surfaces, the clad layer consisting of a different aluminum alloy than the base/bulk alloy beneath the clad layer.

The substrate may alternatively comprise more than one metal or metal alloy in that the substrate may be a combination of two or more metal substrates assembled together such as hot-dipped galvanized steel assembled with aluminum substrates. The substrate may comprise part of a vehicle. "Vehicle" is used herein in its broadest sense and includes all types of vehicles, such as but not limited to airplanes, helicopters, cars, trucks, buses, vans, golf carts, motorcycles, bicycles, railroad cars, tanks and the like. It will be appreciated that the portion of the vehicle that is coated according to the present invention may vary depending on why the coating is being used.

The shape of the metal substrate can be in the form of a sheet, plate, bar, rod or any shape desired, but it is usually in the form of an automobile part, such as a body, door, fender, hood or bumper. The thickness of the substrate can vary as desired.

The curable film-forming composition may be applied directly to the metal substrate when there is no intermediate coating between the substrate and the curable film-forming composition. By this is meant that the substrate may be bare, as described below, or may be treated with one or more pretreatment compositions as described below, but the substrate is not coated with any coating compositions such as an electrodepositable composition or a primer composition prior to application of the curable film-forming composition of the present invention.

As noted above, the substrates to be used may be bare metal substrates. By "bare" is meant a virgin metal substrate that has not been treated with any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

The substrate may optionally be cleaned using conventional cleaning procedures and materials. These would include mild or strong alkaline cleaners such as are commercially available and conventionally used in metal pretreatment processes. Examples of alkaline cleaners include Chemkleen 163 and Chemkleen 177, both of which are available from PPG Industries, Pretreatment and Specialty Products. Such cleaners are generally followed and/or preceded by a water rinse. The metal surface may also be rinsed with an aqueous acidic solution after or in place of cleaning with the alkaline cleaner. Examples of rinse solutions include mild or strong acidic cleaners such as the dilute nitric acid solutions commercially available and conventionally used in metal pretreatment processes.

According to the present invention, at least a portion of a cleaned aluminum substrate surface may be deoxidized, mechanically or chemically. As used herein, the term "deoxidize" means removal of the oxide layer found on the surface of the substrate in order to promote uniform deposition of the pretreatment composition (described below), as well as to promote the adhesion of the pretreatment composition coating to the substrate surface. Suitable deoxidizers will be familiar to those skilled in the art. A typical mechanical deoxidizer may be uniform roughening of the substrate surface, such as by using a scouring or cleaning pad. Typical chemical deoxidizers include, for example, acid-based deoxidizers such as phosphoric acid, nitric acid, fluoroboric acid, sulfuric acid, chromic acid, hydrofluoric acid, and ammonium bifluoride, or Amchem 7/17 deoxidizers (available from Henkel Technologies, Madison Heights, Mich.), OAKITE DEOXIDIZER LNC (commercially available from Chemetall), TURCO DEOXIDIZER 6 (commercially available from Henkel), or combinations thereof. Often, the chemical deoxidizer comprises a carrier, often an aqueous medium, so that the deoxidizer may be in the form of a solution or dispersion in the carrier, in which case the solution or dispersion may be brought into contact with the substrate by any of a variety of known techniques, such as dipping or immersion, spraying, intermittent spraying, dipping followed by spraying, spraying followed by dipping, brushing, or roll-coating.

A metal substrate may optionally be pretreated with any suitable solution known in the art, such as a metal phosphate solution, an aqueous solution containing at least one Group IIIB or IVB metal, an organophosphate solution, an organophosphonate solution, and combinations thereof. The pretreatment solutions may be essentially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc-calcium phosphate, and layers of other types, which may contain one or more multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the *Handbook of Chemistry and Physics,* 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of a yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL®.

In the aerospace industry, anodized surface treatments as well as chromium based conversion coatings/pretreatments are often used on aluminum alloy substrates. Examples of anodized surface treatments would be chromic acid anodizing, phosphoric acid anodizing, boric acid-sulfuric acid anodizing, tartaric acid anodizing, sulfuric acid anodizing. Chromium based conversion coatings would include hexavalent chromium types, such as Bonderite® M-CR1200 from Henkel, and trivalent chromium types, such as Bonderite® M-CR T5900 from Henkel.

The curable film-forming composition of the present invention may be applied to the substrate using conventional techniques including dipping or immersion, spraying, intermittent spraying, dipping followed by spraying, spraying followed by dipping, brushing, or roll-coating.

The coating compositions of the present invention may be used alone as a protective layer or may serve as a unicoat, or monocoat, layer. Alternatively, the compositions of the present invention may be in combination as primers, basecoats, and/or topcoats. Thus the present invention provides for a multi-component composite coating composition comprising a first film-forming composition applied to a substrate to form a colored base coat, and a second, transparent film-forming composition applied on top of the base coat to form a clear top coat, wherein the transparent film-forming composition comprises the curable film-forming composition of the present invention as described above.

Suitable base coats include any of those known in the art, and may be waterborne, solventborne or powdered. The base coat typically includes a film-forming resin, crosslinking material and pigment. Non-limiting examples of suitable base coat compositions include waterborne base coats such as are disclosed in U.S. Pat. Nos. 4,403,003; 4,147,679; and 5,071,904.

After application of each composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 70 to 250° F. (27 to 121° C.) will be sufficient. More than one coating layer of the present composition may be applied if desired. Usually between coats, the previously applied coat is flashed; that is, exposed to ambient conditions for the desired amount of time. Ambient temperature typically ranges from 60 to 90° F. (15.6 to 32.2° C.), such as a typical room temperature, 72° F. (22.2° C.).

The thickness of the coating is usually from 0.1 to 3 mils (2.5 to 75 microns), such as 0.2 to 2.0 mils (5.0 to 50 microns). The coating composition may then be heated. In the curing operation, solvents are driven off and crosslinkable components of the composition are crosslinked. The heating and curing operation is sometimes carried out at a temperature in the range of from 70 to 250° F. (27 to 121° C.) but, if needed, lower or higher temperatures may be used. As noted previously, the coatings of the present invention may also cure without the addition of heat or a drying step. Additionally, the first coating composition may be applied and then a second applied thereto "wet-on-wet", or at least one base coat may be applied on top of a primer before the primer is cured, followed by application of a clear coat to the base coat(s) before the base coat(s) is cured; i. e., "wet-on-wet-on-wet", and the entire multi-layer coating stack cured simultaneously in a compact process. Alternatively, the each coating composition can be cured before application of the next coating composition.

The present invention further provides a method for forming a composite coating on a substrate comprising:

(A) applying a first film-forming composition to at least a portion of a surface of the substrate to form a colored base coat;

(B) applying a second, transparent film-forming composition to at least a portion of the base coat formed in step (A) prior to substantially curing the first film-forming composition, to form a clear top coat thereon, wherein the transparent film-forming composition comprises the curable film-forming composition described above; and (C) holding the substrate at a temperature and for a time sufficient to substantially cure the composite coating after all coating layers have been applied to the substrate. Application and curing methods and conditions may be as described above.

Each of the characteristics and examples described above, and combinations thereof, may be said to be encompassed by the present invention. The present invention is thus drawn to the following nonlimiting aspects: in a first aspect, a curable film-forming composition is provided by the present invention, comprising: (a) a polymeric binder comprising repeating ester groups in the polymer backbone and comprising a plurality of carbamate groups of the structure:

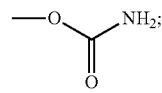

(b) a curing agent comprising functional groups that are reactive with the carbamate functional groups of (a); and (c) a reaction product of: (1) a hydroxyl functional polymer comprising the reaction product of: (i) a monomer comprising at least two ethylenically unsaturated double bonds; (ii) a monomer comprising a carbon atom that is bonded to four moieties wherein one of said moieties is a hydrogen atom and the remainder of said moieties comprises an alkyl group, wherein at least one of the alkyl group-containing moieties comprises an ethylenically unsaturated double bond; and (iii) at least one monomer that is polymerizable with (i) and (ii); wherein each monomer (i), (ii), and (iii) is different and wherein the monomer (i), (ii) and/or (iii) contains a hydroxyl functional group; and (2) a lactone or lactam.

In a second aspect, in the composition according to the first aspect described above, the monomer (i) comprises a di(meth)acrylate monomer.

In a third aspect, in any of the compositions according to either of the first or second aspect described above, the monomer (ii) comprises 2-ethyl hexyl(meth)acrylate, 2-butyl hexyl(meth)acrylate, 2-methyl hexyl(meth)acrylate, isobornyl acrylate, isobornyl methacrylate, or combinations thereof.

In a fourth aspect, in any of the compositions according to any aspect described above, the monomer (iii) comprises a hydroxy functional (meth) acrylate.

In a fifth aspect, in the composition according to the fourth aspect above, the monomer (iii) further comprises an ethylenically unsaturated monomer that does not contain any additional, different reactive functional groups.

In a sixth aspect, in any of the compositions according to any aspect described above, the polymeric binder (a) comprises a polyester which is a reaction product of (i) an alkyl carbamate; (ii) an organic polycarboxylic acid or anhydride and (iii) a mixture of at least one diol and at least one triol.

In a seventh aspect, in the composition according to the sixth aspect above, the alkyl carbamate comprises methyl carbamate.

In an eighth aspect, a multi-component composite coating composition is provided comprising a first film-forming composition applied to a substrate to form a colored base coat, and a second, transparent film-forming composition applied on top of the base coat to form a clear top coat, wherein the transparent film-forming composition comprises any of the compositions according to any of the first through seventh aspects above.

In a ninth aspect, a method for forming a composite coating on a substrate is provided comprising:

(A) applying a first film-forming composition to at least a portion of a surface of the substrate to form a colored base coat;

(B) applying a second, transparent film-forming composition to at least a portion of the base coat formed in step (A) prior to substantially curing the first film-forming composition, to form a clear top coat thereon, wherein the transparent film-forming composition comprises any of the compositions according to any of the first through seventh aspects above; and (C) holding the substrate at a temperature and for a time sufficient to substantially cure the composite coating after all coating layers have been applied to the substrate.

The invention will be further described by reference to the following examples. Unless otherwise indicated, all parts are by weight.

Example A

An acrylic polymer was prepared as described in Example 1 in the U.S. Pat. No. 5,212,273.

Example B

A polyol was prepared with the following ingredients:

|  | Ingredients | Amount (gram) |
|---|---|---|
| Charge 1: | methoxy propyl acetate | 844.1 |
| Charge 2: | Hydroxy propyl acrylate | 720.0 |
| (premixed) | butyl methacrylate | 1044.0 |
|  | alpha-methyl styrene dimer | 36.0 |
| Charge 3: | tertiary amyl peroxy-2-ethyl hexanoate | 27.0 |
| (premixed) | methoxy propyl acetate | 216.0 |
| Charge 4: | methoxy propyl acetate | 23.0 |
| Charge 5: | methoxy propyl acetate | 23.0 |

To a suitable reaction vessel equipped with a stirrer, reflux condenser, thermometer, heating mantle and nitrogen inlet, Charge 1 was added at ambient temperature. The temperature was then increased to reflux, at which time a premix of Charge 3 was added over 210 minutes, and Charge 2 was added over 180 minutes. Upon completion of Charges 2 and 3, Charge 4 and Charge 5 were added as a rinse for Charge 2, and Charge 3 respectively, followed by a hold for an additional 60 minutes at the reflux temperature. Thereafter the reaction temperature was cooled to room temperature. The polymeric product thus formed had a solids of 60.5% (1 hour at 110° C.), and weight average molecular weight of 9,657.

Example C

A polyol was prepared with the following ingredients:

|  | Ingredients | Amount (gram) |
|---|---|---|
| Charge 1: | SOLVESSO -100 | 345.4 |
| Charge 2: | Hydroxyethyl methacrylate | 161.0 |
| (premixed) | isobornyl acrylate | 280.5 |
|  | 2-ethyl hexyl acrylate | 386.7 |
|  | 4-hydroxy butyl acrylate | 167.6 |
|  | hexanediol diacrylate | 77.3 |
|  | SOLVESSO -100 | 144.5 |
| Charge 3: | tertiary butyl peroxy acetate | 37.5 |
| (premixed) | SOLVESSO -100 | 112.0 |
| Charge 4: | SOLVESSO -100 | 20.4 |
| Charge 5: | SOLVESSO -100 | 20.4 |
| Charge 6: | Butyl stannoic acid | 0.75 |
|  | SOLVESSO -100 | 8.4 |
| Charge 7: | ε-caprolactone | 216.2 |
|  | SOLVESSO -100 | 19.6 |
| Charge 8: | SOLVESSO -100 | 20.4 |

To a suitable reaction vessel equipped with a stirrer, reflux condenser, thermometer, heating mantle and nitrogen inlet, Charge 1 was added at ambient temperature. The temperature was then increased to 155° C., at which time a premix of Charge 3 was added over 315 minutes, and Charge 2 was added over 300 minutes. Upon completion of Charges 2 and 3, Charge 4 and Charge 5 were added as a rinse for Charge 2 and Charge 3 respectively, followed by a hold for an additional 60 minutes at 155° C. Thereafter Charge 6 was added, followed by addition of Charge 7 over 30 minutes and then Charge 8. The reaction mixture was then held at 155° C. for 30 minutes. Upon the completion of the hold, the reaction temperature was cooled to room temperature. The polymeric product thus formed had a solids of 64.35% (1 hour at 110° C.), and weight average molecular weight of 8,504.

Example D

A carbamate functional polyester was prepared as described in Example 3 in the U.S. Pat. No. 6,228,953.

Example E

A siloxane borate polyol was prepared in two steps. In step 1: siloxane polyol was prepared as described in Example AA in the U.S. Pat. No. 6,534,188, except that the MASILWAX was purchased from Emrold Performance Materials. In step 2: the siloxane borate material was prepared as described in Example C in the U.S. Pat. No. 6,534,188, in a monomethyl ether of propylene glycol instead of isopropanol using siloxane polyol prepared in step 1.

Example F

A siloxane borate polyol was prepared in two steps. In step 1: siloxane polyol was prepared as described in Example AA in the U.S. Pat. No. 6,534,188, except that the MASILWAX was purchased from Wacker Chemie. In step 2: the siloxane borate material was prepared as described in Example C in the U.S. Pat. No. 6,534,188, in monomethyl ether of propylene glycol instead of isopropanol using siloxane polyol prepared in step 1.

Examples 1 and 2

Two (2) clearcoat compositions were prepared from the following mixture of ingredients. Example 1 is a control while Example 2 demonstrates a composition of the present invention:

| Components | Example 1 (control) | Example 2 |
|---|---|---|
| Methyl N-amyl ketone | 74.5 | 75.5 |
| Ethyl 3-ethoxypropanoate | 64.2 | 65.1 |
| SOLVESSO 100[1] | 24.0 | 24.4 |
| Dipropylene glycol monomethyl ether | 8.0 | 8.1 |
| EVERSORB 76[2] | 12.4 | 12.6 |
| EVERSORB 74[2] | 12.4 | 12.6 |
| RESIMENE 757[3] | 369.8 | 374.9 |
| Example A | 49.2 | 49.8 |
| Silica dispersion[4] | 216.5 | 219.5 |
| Example B | 193.3 | 98.0 |
| Example C | — | 102.0 |
| Example D | 376.8 | 382.2 |
| DISPARLON OX-60[5] | 3..0 | 3.1 |
| EVERSORB 93[6] | 2.5 | 2.5 |
| Example E | 16.1 | 16.3 |
| Example F | 3.3 | 3.4 |

-continued

| Components | Example 1 (control) | Example 2 |
|---|---|---|
| Isobutyl alcohol | 19.2 | 19.5 |
| Dodecylbenzylsulfonic acid solution | 30.4 | 30.9 |
| Reduction | | |
| Methyl N-amyl ketone | 50.3 | 10.0 |
| TOTAL | 1525.9 | 1510.2 |

[1]Blend of aromatic solvents available from Everlight Chemical Taiwan.
[2]UV absorbers commercially available from Everlight Chemical Taiwan.
[3]Melamine curing agent commercially available from INEOS Melamines.
[4]A dispersion of 8% Aerosil R812 silica mixed with 42% n-butyl acetate and 50% acrylic polyol. The acrylic polyol is made at 67% solid in the mixture of 40% solvesso-100 and 60% methoxy propyl acetate and is made by copolymerizing 18.5% butyl methacrylate, 40% 2-hydroxy propyl acrylate, 20.5% styrene, 19.0% butyl acrylate, and 2% acrylic acid using 1% di-tertiary amyl peroxide. The polyol has a weight average molecular weight of around 9000.
[5]Additives available from Kusumoto Chemicals.
[6]Hindered amine light stabilizer available from Everlight Chemical Taiwan.

A solventborne primer commercially available from PPG Industries, Inc. as FCP6578R was spray applied in an environment controlled to 70-75° F. (21-24° C.) and 50-60% relative humidity onto 4 inch by 12 inch (10 cm by 30 cm) steel panels that were coated with PPG Electrocoat (ED 6280Z) commercially available from PPG Industries, Inc. The substrate panels were obtained from ACT Test Panels, LLC of Hillsdale, Mich. The primer was applied in one coat, and then flashed at ambient temperature for 5 minutes and then baked for 30 minutes at 325° F. (163° C.). The film thickness was approximately 1.2 mils (30 microns). A solventborne basecoat commercially available from PPG Industries, Inc. as MCT7226RL was spray applied in an environment controlled to 70-75° F. (21-24° C.) and 60-70% relative humidity. The basecoat was applied in two coats with a 1.5 minute flash between coats, and then flashed at ambient temperature for 4.5 minutes. The film thickness was approximately 0.6 mils (15 microns). Each clearcoat was spray applied over vertically oriented, basecoated panels in two coats with a 1.5 minute flash between coats. The clearcoated panels were allowed to flash for 8 minutes at ambient conditions, then baked for 10 minutes at 185° F. (85° C.) followed by a bake for 25 minutes 285° F. (140° C.). The film thickness was approximately 2.0 mils (50 microns).

Appearance and physical properties were measured on the coated panels. Lower BYK Wavescan values and higher DOI values are more desirable for appearance. Higher measured percent non-volatiles is a more desirable property.

Vertical Panels - Appearance and Physical Properties

| Example | BYK Wavescan[1] Long Wave | BYK Wavescan[1] Short Wave | Spray viscosity[2] (sec) | Percent non-volatile content[3] |
|---|---|---|---|---|
| 1 | 4.0 | 13.8 | 28 | 57.2 |
| 2 | 3.3 | 12.7 | 28 | 59.7 |

[1]BYK Wavescan instrument manufactured by BYK Gardner USA of Columbia, Maryland.
[2]Viscosity measured in seconds with a #4 FORD efflux cup at ambient temperature.
[3]Percent non-volatile content measured with a HX204 Moisture Analyzer manufactured by Mettler Toledo.

Whereas particular examples of this invention have been described above for purposes of illustration, it will be evident to those skilled in the art that numerous variations of the details of the present invention may be made without departing from the scope of the invention as defined in the appended claims.

We claim:

1. A curable film-forming composition comprising:
   (a) a polymeric binder comprising repeating ester groups in the polymer backbone and further comprising a plurality of carbamate groups of the structure:

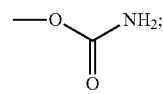

(b) a curing agent comprising functional groups that are reactive with the carbamate functional groups of (a); and
   (c) a reaction product of:
   (1) a hydroxyl functional (meth)acrylic polymer comprising the reaction product of:
       (i) at least 1 percent by weight of a (meth)acrylic monomer comprising at least two ethylenically unsaturated double bonds;
       (ii) at least 10 percent by weight of a (meth)acrylic monomer comprising a carbon atom that is bonded to four moieties wherein one of said moieties is a hydrogen atom and the remainder of said moieties comprises an alkyl group, wherein at least one of the alkyl group-containing moieties comprises an ethylenically unsaturated double bond; and
       (iii) at least one ethylenically unsaturated monomer that is polymerizable with (i) and (ii); wherein each monomer (i), (ii), and (iii) is different and wherein the monomer (i), (ii) and/or (iii) contains a hydroxyl functional group; and
   (2) a lactone or lactam; wherein the reaction product (c) has a weight average molecular weight of at least 500 to 8504.

2. The curable film-forming composition according to claim 1, wherein (i) comprises a di(meth)acrylate monomer.

3. The curable film-forming composition according to claim 1, wherein (ii) comprises 2-ethyl hexyl(meth)acrylate, 2-butyl hexyl(meth)acrylate, 2-methyl hexyl(meth)acrylate, isobornyl acrylate, isobornyl methacrylate, or combinations thereof.

4. The curable film-forming composition according to claim 1, wherein (iii) comprises a hydroxy functional (meth)acrylate.

5. The curable film-forming composition according to claim 4, wherein (iii) further comprises an ethylenically unsaturated monomer that does not contain any additional, different reactive functional groups.

6. The curable film-forming composition of claim 1, wherein the polymeric binder (a) comprises a polyester which is a reaction product of (i) an alkyl carbamate; (ii) an organic polycarboxylic acid or anhydride and (iii) a mixture of at least one diol and at least one triol.

7. The curable film-forming composition of claim 6, wherein the alkyl carbamate comprises methyl carbamate.

8. A multi-component composite coating composition comprising a first film-forming composition applied to a substrate to form a colored base coat, and a second, transparent film-forming composition applied on top of the base coat to form a clear top coat, wherein the transparent film-forming composition comprises a curable film-forming composition comprising:
   (a) a polymeric binder comprising repeating ester groups in the polymer backbone and further comprising a plurality of carbamate groups of the structure:

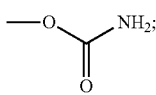

(b) a curing agent comprising functional groups that are reactive with the carbamate functional groups of (a); and (c) a reaction product of:
(1) a hydroxyl functional (meth)acrylic polymer comprising the reaction product of:
  (i) at least 1 percent by weight of a (meth)acrylic monomer comprising at least two ethylenically unsaturated double bonds;
  (ii) at least 10 percent by weight of a (meth)acrylic monomer comprising a carbon atom that is bonded to four moieties wherein one of said moieties is a hydrogen atom and the remainder of said moieties comprises an alkyl group, wherein at least one of the alkyl group-containing moieties comprises an ethylenically unsaturated double bond; and
  (iii) at least one ethylenically unsaturated monomer that is polymerizable with (i) and (ii); wherein each monomer (i), (ii), and (iii) is different and wherein the monomer (i), (ii) and/or (iii) contains a hydroxyl functional group; and
(2) a lactone or lactam; wherein the reaction product (c) has a weight average molecular weight of at least 500 to 8504.

9. The multi-component composite coating composition according to claim 8, wherein (i) comprises a di(meth)acrylate monomer.

10. The multi-component composite coating composition according to claim 8, wherein (ii) comprises 2-ethyl hexyl (meth)acrylate, 2-butyl hexyl(meth)acrylate, 2-methyl hexyl (meth)acrylate, isobornyl acrylate, isobornyl methacrylate, or combinations thereof.

11. The multi-component composite coating composition according to claim 8, wherein (iii) comprises a hydroxy functional (meth)acrylate.

12. The multi-component composite coating composition according to claim 11, wherein (iii) further comprises an ethylenically unsaturated monomer that does not contain any additional, different reactive functional groups.

13. The multi-component composite coating composition of claim 8, wherein the polymeric binder (a) comprises a polyester which is a reaction product of (i) an alkyl carbamate; (ii) an organic polycarboxylic acid or anhydride and (iii) a mixture of at least one diol and at least one triol.

14. The multi-component composite coating composition of claim 13, wherein the alkyl carbamate comprises methyl carbamate.

15. A method for forming a composite coating on a substrate comprising:
(A) applying a first film-forming composition to at least a portion of a surface of the substrate to form a colored base coat;
(B) applying a second, transparent film-forming composition to at least a portion of the base coat formed in step (A) prior to curing the first film-forming composition, to form a clear top coat thereon, wherein the transparent film-forming composition comprises a curable film-forming composition comprising:
(a) a polymeric binder comprising repeating ester groups in the polymer backbone and further comprising a plurality of carbamate groups of the structure:

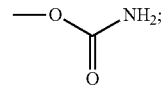

(b) a curing agent comprising functional groups that are reactive with the carbamate functional groups of (a); and
(c) a reaction product of:
(1) a hydroxyl functional (meth)acrylic polymer comprising the reaction product of:
  (i) at least 1 percent by weight of a (meth)acrylic monomer comprising at least two ethylenically unsaturated double bonds;
  (ii) at least 10 percent by weight of a (meth)acrylic monomer comprising a carbon atom that is bonded to four moieties wherein one of said moieties is a hydrogen atom and the remainder of said moieties comprises an alkyl group, wherein at least one of the alkyl group-containing moieties comprises an ethylenically unsaturated double bond; and
  (iii) at least one ethylenically unsaturated monomer that is polymerizable with (i) and (ii); wherein each monomer (i), (ii), and (iii) is different and wherein the monomer (i), (ii) and/or (iii) contains a hydroxyl functional group; and
(2) a lactone or lactam; wherein the reaction product (c) has a weight average molecular weight of at least 500 to 8504; and
(C) holding the substrate at a temperature and for a time sufficient to cure the composite coating after all coating layers have been applied to the substrate.

\* \* \* \* \*